US009578076B2

(12) United States Patent
Olivier et al.

(10) Patent No.: US 9,578,076 B2
(45) Date of Patent: Feb. 21, 2017

(54) VISUAL COMMUNICATION USING A ROBOTIC DEVICE

(75) Inventors: Charles Olivier, Bothell, WA (US); Jean Sebastien Fouillade, Redmond, WA (US); William M. Crow, Sequim, WA (US); Francois Burianek, Kirkland, WA (US); Russ Sanchez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 679 days.

(21) Appl. No.: 13/098,492

(22) Filed: May 2, 2011

(65) Prior Publication Data

US 2012/0281092 A1    Nov. 8, 2012

(51) Int. Cl.
*H04N 7/18* (2006.01)
*H04L 29/06* (2006.01)
*H04L 29/08* (2006.01)

(52) U.S. Cl.
CPC ........... *H04L 65/4092* (2013.01); *H04L 67/12* (2013.01); *H04L 67/38* (2013.01)

(58) Field of Classification Search
CPC .................................................. H04L 67/125
USPC ... 348/51, 61, 148, 207.99, 211.99, 211.11, 348/211.12, 211.13
See application file for complete search history.

(56) References Cited

U.S. PATENT DOCUMENTS

| | | | |
|---|---|---|---|
| 6,925,357 B2 * | 8/2005 | Wang et al. | 700/245 |
| 6,999,061 B2 | 2/2006 | Hara et al. | |
| 8,149,281 B2 * | 4/2012 | Cheng | 348/207.99 |
| 2001/0035976 A1 | 11/2001 | Poon | |
| 2004/0037465 A1 * | 2/2004 | Krause | 382/199 |
| 2007/0230815 A1 * | 10/2007 | Park et al. | 382/254 |
| 2009/0055019 A1 | 2/2009 | Stiehl et al. | |
| 2010/0199232 A1 | 8/2010 | Mistry et al. | |
| 2010/0268383 A1 * | 10/2010 | Wang et al. | 700/248 |
| 2010/0306647 A1 | 12/2010 | Zhang et al. | |
| 2010/0315491 A1 * | 12/2010 | Carter et al. | 348/51 |
| 2011/0234481 A1 * | 9/2011 | Katz | H04N 9/31 345/156 |
| 2012/0229589 A1 * | 9/2012 | Barrus | H04N 7/147 348/14.08 |

OTHER PUBLICATIONS

Ou, et al., "Gestural Communication over Video Stream: Supporting Multimodal Interaction for Remote Collaborative Physical Tasks", Retrieved at << http://www.cs.cmu.edu/~gestures/papers/p107-ou.pdf >>, International Conference on Multimodal User Interfaces (ICMI-PUI'03), Nov. 5-7, 2003, pp. 8.

(Continued)

*Primary Examiner* — Christopher S Kelley
*Assistant Examiner* — Jonathan Messmore
(74) *Attorney, Agent, or Firm* — Sunah Lee; Dan Choi; Micky Minhas

(57) ABSTRACT

Technology is described for visually communicating using a robotic device. An example of a method can include a video feed sent from the video camera of the robotic device to the remote user. A projection surface identified in the video feed can then be sent to the remote user using an application. Another operation can be obtaining an image from the remote user using the application. The image created by the remote user can then be projected on the projection surface.

20 Claims, 4 Drawing Sheets

(56) References Cited

OTHER PUBLICATIONS

Myers, et al., "Multimodal User Interface for Mobile Robots", Retrieved at << http://adam.cheyer.com/papers/433-pa-98-069.pdf>>, Retrieved Date: Feb. 4, 2011, pp. 1-4.

Ishii, et al., "Integration of interpersonal space and shared workspace: ClearBoard design and experiments", Retrieved at << http://tangible.media.mit.edu/content/papers/pdf/ClearBoard_TOIS93.pdf >>, ACM Transactions on Information Systems, vol. 11, No. 4, Oct. 1993, pp. 349-375.

* cited by examiner

VISUAL COMMUNICATION USING A ROBOTIC DEVICE

BACKGROUND

Robotic devices can provide services for humans. Examples of a useful robotic device can be a simple autonomous robot to provide services to an elderly person or to patrol a workplace at night. Robotic devices can also have applications that control the operations that are performed by the robotic device. For example, one application may include functions for accomplishing navigation tasks by localizing or estimating the current location of the robotic device and for navigating reliably to reach locations in the environment. Other example applications can include telecommunications, photo capture, video playback, audio playback, navigation, and video conferencing abilities.

An example of a video conference application can use a robotic device where a video screen on a robotic device displays a video image of a remote user to communicate with a local user at the location where the robotic device is located. The video screen can be viewed by the local user at the robotic device's location and the remote user can view the local user using a camera mounted in the robotic device. This allows a two-way video conversation to take place using audio and video. If desired, the robotic device may follow the local user around in a building during the video conversation. However, the interaction between the local user and the remote user is generally limited to the screen of the robotic device and what the camera captures of the local user.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various examples are described for visually communicating using a robotic device. An example of a method can include a video feed sent from the video camera of the robotic device to the remote user. A projection surface identified in the video feed can also be sent to the remote user using an application. Another operation can be obtaining an image from the remote user using the application. The image from the remote user can then be projected on the projection surface.

An example of a system for projecting a remotely created image on a projection surface using a robotic device can also be provided. The system can include a robotic device configured to navigate to a location with the projection surface. A video camera can be included with the robotic device to capture a point of view with the projection surface. In addition, a telepresence application can display a video stream from the video camera to a remote user and receive an image from the remote user. For example, the remote user can draw an image on the video stream. A projector for the robotic device in communication with the telepresence application can project the image received from the remote user onto the projection surface.

DETAILED DESCRIPTION

Figure 1:
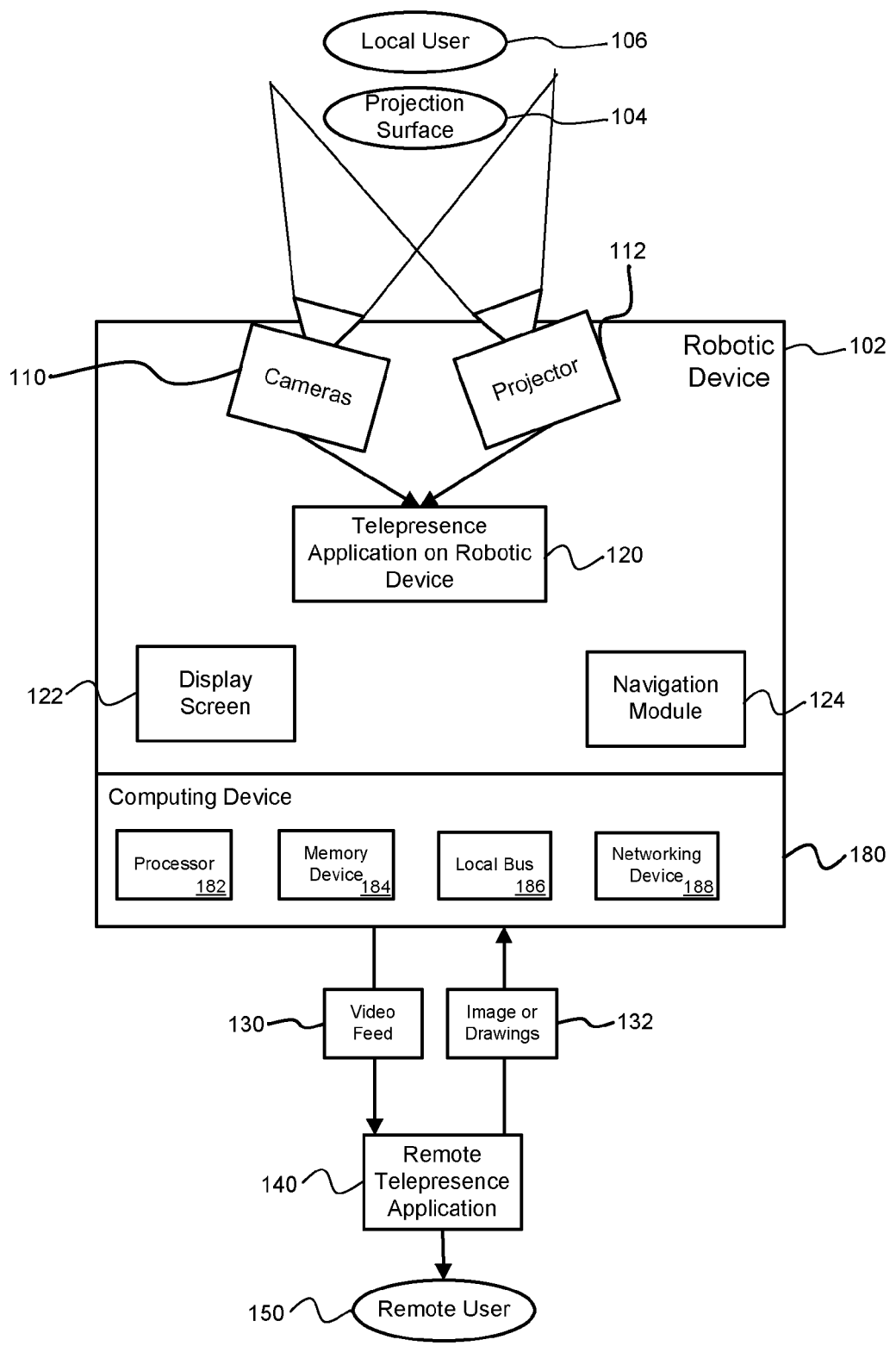
FIG. 1 is a block diagram illustrating an example of a system for projecting a remotely created image onto a projection surface using a robotic device.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

As part of a robotic device's telepresence session, a remote user can be provided with technology to virtually draw in a robotic device's environment in order to convey ideas, provide sketches, play games, or otherwise interact with a local user. The term virtually drawing can mean using light from a projector of a robotic device to draw figures, shapes and produce other indicia on a surface local to the robotic device. A telepresence session can refer to using technology to enable a remote user to feel as if the remote user is present or to give the remote user the appearance that the remote user is present at a location other than the remote user's true location. This technology can enable a remote user to draw on or project images, pictures, or shapes on specific areas, objects, furniture, animals, or people during a robotic telepresence session by leveraging robotic mobility, image projectors for a robotic device, remote navigation, and drawing applications.

As part of a communication session, the remote user can run an application that accesses the robotic device's video feed. That application may enable the remote user to view or select an area in the robotic device's environment and create an image (e.g., drawing) that can be mapped directly onto the video feed of the robotic device. For example, the creation of an image can include drawing electronic lines, figures, and indicia. The user's drawing motion (i.e., cursor position) on the video feed can be translated into images, drawings, or objects that are projected through the robotic device's projection system as the drawing motions are performed or immediately thereafter. Local and remote users are able to view the images or drawings that are being projected on the projection area as changes are made by the remote user. This continuous update and feedback can give the remote user a feeling that the remote user is drawing directly onto a remote projection surface using light from the robotic device's projector.

FIG. 1 illustrates an example system for projecting a remotely created image on a surface using a robotic device. The system can include the robotic device 102 configured to navigate to a location with a projection surface 104. The robotic device can be a mobile robot with wheels or legs, a stationary robot with moveable limbs, a robotic arm, or another type of robotic device. A video camera 110 can be included for the robotic device to capture a point of view with the projection surface. To capture a desired point of view, the robotic device may move to a desired location and/or orient the video camera to capture a point of view.

A telepresence application 120 on the robotic device can be used to send and display a video feed 130 from the video camera 110 to a remote user 150. A remote user can be a user located on a network different than the robotic device's network, and the two networks can communicate through a connecting LAN (Local Area Network), WAN (Wide Area Network) or the Internet. The robotic device's video feed sent to the remote user can show what is being captured by the robotic device's camera as the video feed is streamed to the remote user.

The remote user 150 can access the robotic device 102 through the remote telepresence application 140 on a personal computer, mobile phone, computing tablet, a game console, or another computing device. The remote application can be a stand-alone application or embedded in a browser. The remote module (e.g., client module) of the telepresence application can be used to display the video stream to the remote user. As a more specific example, the overall telepresence application can be composed of a robotic application component and a remote client component which communicate with each other.

A projector 112 can be included for the robotic device and the projector can be in communication with the telepresence application 140 to project an image received from the remote user on the projection surface 104. The projector can be mounted so that the projection surface can be changed using motors or other robotic actuator mechanisms.

The remote user 150 can create an image 132 by drawing or embedding objects and figures using the remote telepresence application (e.g., remote client component). For example, the remote user can virtually draw on the video feed 130 displaying the projection surface in the video feed, and project virtual drawings obtained from the remote user onto the projection surface. The image with drawn objects or embedded objects can be sent back to the telepresence application on the robotic device, and the video feed can also show the robotic device's point-of-view as combined with the remote user's drawings or images. In another example, the remote user may draw on a separate drawing area in the telepresence application and then the drawings or images can be overlaid onto the video stream when the user activates a user interface control (e.g., a graphical button).

A local user 106 can also interact with objects drawn in an image on the projection surface 104. The local user can be located in the same physical environment as the robotic device during a robotic telepresence session. The video camera 110 of the robotic device can detect a position of the local user to enable the user to interact with an object drawn in the image in the projection. For example, the position of the local user with respect to the projection surface can be detected to allow the local user to virtually move, hit, deform, or change drawing elements. A further example of a robotic telepresence session can be a communication session in which a remote user takes over control of a robotic device and receives video, audio and sensory information from that robotic device and the local user can interact with figures that the remote user is drawing while the figures are drawn. The local user is illustrated in FIG. 1 with the projection surface between the local user and the robotic device 102. However, the local user can be in any number of other positions with respect to the projection surface and the projector. For example, the local user may be between the projection surface and the robotic device, behind the robotic device, or beside the robotic device. These varying local user positions can allow the local user to introduce a hand, arm or other pointer into the projection area.

A depth camera 110 can be used in addition to the visual camera to identify a depth and shape of a projection surface. The drawing or image projected onto the projection surface can also be conformed to the shape of the projection surface as detected by the depth camera. For example, a drawing can have a graphical transformation applied such as a warping function or another graphical transformation so that the drawn image does not appear significantly distorted in the projection but may appear closer to what the remote user had originally drawn without the distortion introduced by the projection onto a physical object.

The robotic device 102 can further include a computing device 180 with a hardware processor device 182, a hardware memory device 184, a local communication bus 186 to enable communication between hardware devices and components, and a networking device 188 for communication across a network with the compute nodes, processes on the compute nodes, or computing devices on other agents. The computing device can be used to execute the telepresence application and process other robotic device functions. The robotic device 102 can also include a display screen 122 to display the robotic device's status, application statuses, network communications, or other robotic device information. A navigation module 124 can also provide the capability for the robotic device to navigate through an environment autonomously or under the remote user's instructions.

Figure 2:
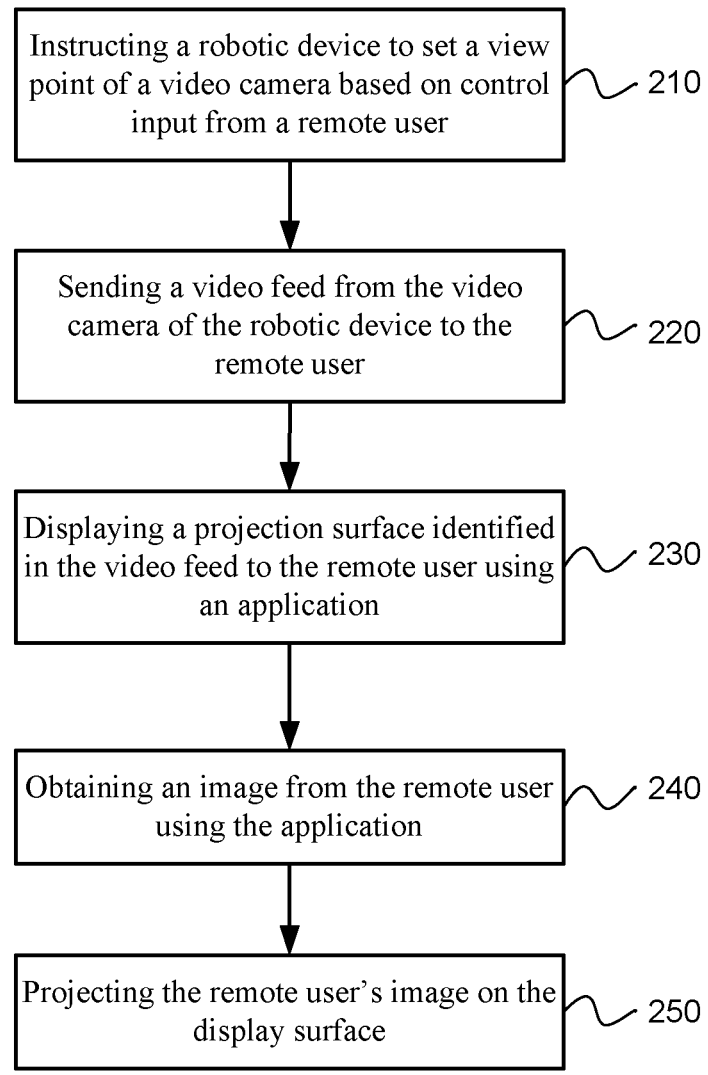
FIG. 2 is an example of a flowchart illustrating a method for visually communicating using a robotic device.

FIG. 2 illustrates an example of a method for communicating using a robotic device. A video capture session for a remote user of a robotic device can be initiated. This allows the remote user to view where the robotic device is currently located and the remote user, local user, or another user can instruct the robotic device to navigate to a location in the environment. The method can include the operation of instructing a robotic device to set a view point of a video camera based on control input from a remote user, as in block 210. This can include moving the robotic device to a desired location and/or setting the orientation of a camera carried by the robotic device. Alternatively, the control of the robotic device may be autonomous and controlled by a software application with data.

A video feed can be sent from the video camera of the robotic device to the remote user, as in block 220. A projection surface that has been identified in the video feed can also be displayed to the remote user using an application, as in block 230. The application may be a telepresence application where a user is able to control and send data to a robotic device with a robotic application component and a remote client component. In one example, the telepresence application can detect a projection area in the video feed that is believed to be a good fit for projecting onto. The remote user may also have the ability to adjust the automatically selected projection area by activating an adjustment mode and moving around graphical handles on a bounded projection area. Alternatively, the remote user can select the area in the video stream that is desired as the projection area by tracing a desired area.

An image can then be obtained from the remote user using the application, as in block 240. The image can be obtained by enabling the remote user to draw on the projection surface identified in the video feed. In addition, the remote user may provide or insert graphical objects that can be displayed on the projection surface.

The remote user's image or drawings can then be projected on the display surface, as in block 250. The projector for the robotic device can be aligned with the view point of the camera and this can allow the remote user to virtually write on the projection surface that the remote user is viewing. The image can include the remote user's free hand drawings, typed text, embedded photos or other image material created by the remote user. Thus, the drawn images can appear to be on the selected display surface or projection area due to the projected drawing.

In one example, once the remote user has aligned a drawing area with the projection surface, the camera may be panned and tilted relative to the projector to view other areas in the remote scene. Then the telepresence application or robotic device can dynamically adjust the drawing area to remain at a fixed location and orientation with respect to the remote environment. To the remote user, such dynamic drawing area adjustments can cause a portion of the drawing surface to appear to move off the edges of the field of view as the camera moved, and the area available for drawing may be much less than the original drawing area. In other words, the drawing area may appear fixed with respect to the selected projection surface. With a sufficiently large pan or tilt motion, the entire drawing area may move off the field of view based on the current camera position. However, when the camera is adjusted back to the original position, the drawing area can return to the screen and be both visible and active for additional drawing. This function can allow the user to draw in one area of the remote environment as defined by the camera orientation but still have the freedom to control the camera to look at areas other than the area which maps to the projector's field of view. The remote user's display can be dynamically adjusted to accurately reflect any changes of alignment between the camera and projector and the associated change to the available drawing area.

Further, a local user may interact with objects drawn in the image on the projection surface. The camera of the robotic device can detect a position of the local user to enable the local user to interact with objects drawn in the image on the projection surface. A depth camera can also be used to allow the local user to interact with objects drawn by the remote user. For example, a depth camera can be used to help identify the local user's index finger and the local user can use their index finger to draw on the projection area too.

The depth camera can also be used to identify a shape of a projection surface using a depth camera of the robotic device. Knowing the shape of the projection area can allow the application to modify the image or drawing projected onto the projection surface to accommodate a shape of the projection surface. This allows the image to be viewed with less distortion on a variety of projection surfaces. For example, if the remote user draws some lettering that is projected on a surface at an angle to the robotic device, then the lettering can be graphically transformed so that the lettering is more readable on the angled projection surface.

Figure 3:
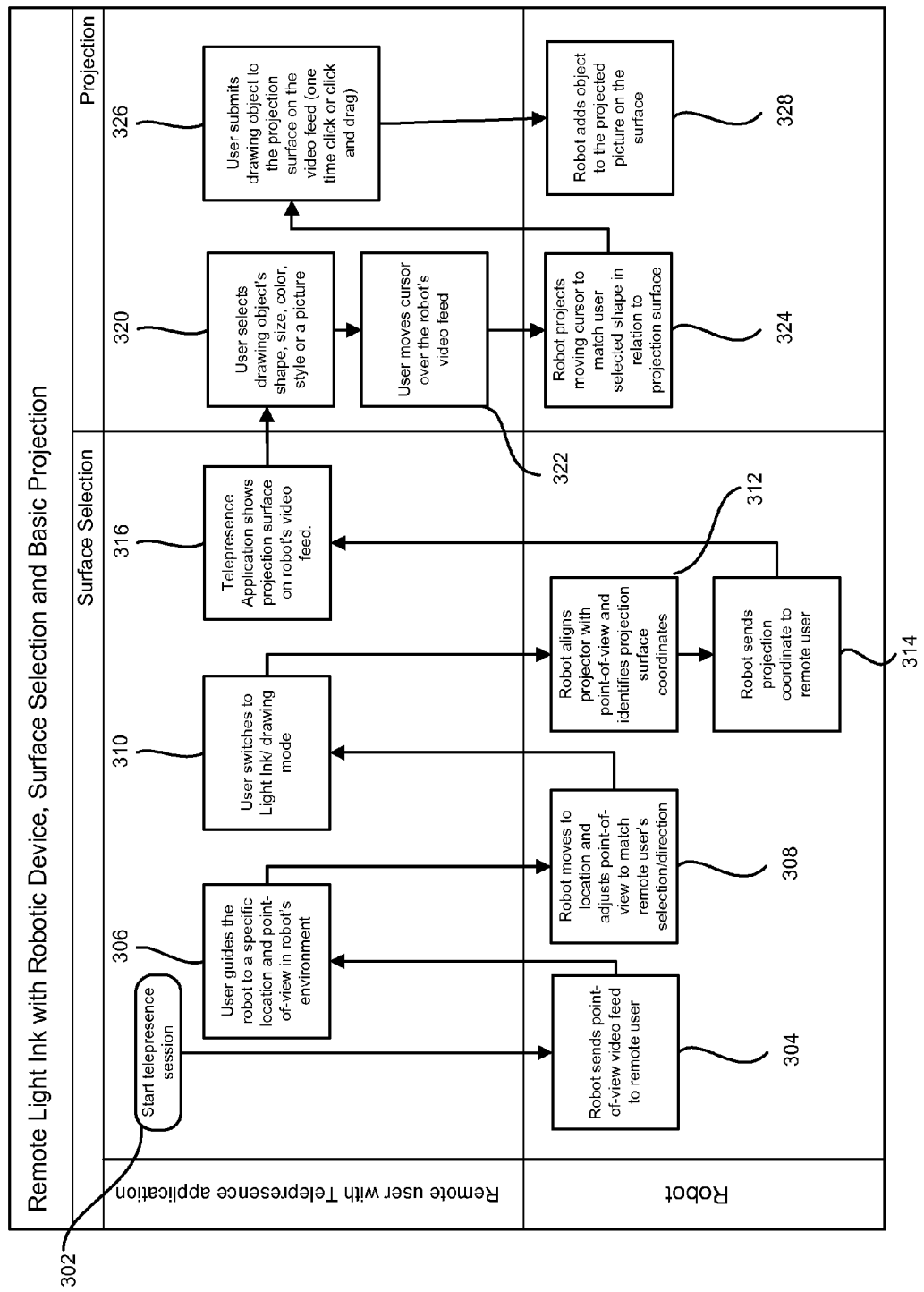
FIG. 3 is a flowchart illustrating an example of a method for creating and projecting a remotely created image on a projection surface using a robotic device.

FIG. 3 further illustrates an example of the technology to enable a user to draw virtually in a remote environment during a robotic telepresence session. This can be called light ink for a robotic device. Initially, a telepresence session can be started by a remote user or a local user, as in block 302. A robotic telepresence session may entail a remote user running an application on a personal computer, mobile device, or game console to access a robotic device's video, audio and sensory data with the ability to navigate the robotic device.

The robotic device can then send point of view video feed to the remote user, as in block 304. The robotic device can be guided by a user to a specific location and point-of-view in the robotic device's environment, as in block 306. After the robotic device receives the instructions, then the robotic device can move to the location and adjust a point-of-view of the robotic device and the camera to match the remote user's selections and/or directions, as in block 308. At this point, the remote user can switch to the drawing mode (e.g., light ink mode), as in block 310.

This technology can leverage the mobility of a robotic device to allow a remote user to have the robotic device navigate to and select a visible surface in a robotic device's environment as a drawing surface. This navigation and selection can be performed via the telepresence application. The selected location can be any item or surface visible through the robotic device's point-of-view that can be reached by the projector. The projector located within the robotic device can project drawings, sketches, shapes or pictures that the remote user wishes to optically overlay on the robotic device's environment and share with a local user. This allows the remote user to draw remotely and virtually on surfaces local to the robotic device.

A remote user can position the robotic device to face and project on a surface. The positioning functionality can be part of the robotic device's navigation system. By positioning the robotic device correctly, the user can project on a viewable surface. The robotic device's projector can be aligned with the robotic device's point-of-view sent to the remote user which may make the selection of the projection area or projection surface easier, as in block 312. The robotic device can further identify a projection area and send the selection coordinates to a remote user for viewing, as in block 314. By aligning the projector with the robotic device's camera point-of-view, the remote user is able to use the projector to draw on surfaces seen in that camera point-of-view. In addition, a projection surface can be shown on the robotic device's video feed, as in block 316. This compositing may include overlaying the location of the candidate projection surface on the robotic device's video feed shared with the remote user.

Once a projection surface has been selected, the remote user can use the robotic telepresence application to draw on that projection surface. Previously existing telepresence applications do not enable the user to draw directly on a remote video feed. Instead such previous applications have provided a local whiteboard that is replicated over to a remote screen typically located on a personal computer (PC) or television monitor. In this technology, the whiteboard is the environment as seen by the robotic device and the user can project drawings directly onto that environment.

A remote user can select the type of drawing tool that the remote user would like to use, or a default selection can be used, as in block 320. The user can select between preset shapes such as star shaped stamps, tic-tac-toe boards, paint brush shape, color, size, style, photos, or other pictures to add in the drawing tool.

Shapes and/or objects can be inserted or applied to the projection surface that are dynamic or animated. Examples include a spinning star, pulsating light sphere, or bouncing ball. More complicated and dynamic animations can be added such as a butterfly with flapping wings, which may move around the projection surface to make the butterfly appear more life-like. These shapes or animations can be pre-programmed with certain behaviors so that the remote user can just add the shapes or animations to the projection surface and the user does not have to manually move them about. In addition the remote user can customize the shapes or animations in some way (e.g. by modifying the type of butterfly, etc.). In another example, the user may desire to display engineering drawings with perspective, CAD (computer-aided design) drawings, or other 3D (three dimensional) modeled objects that can be displayed on a projection surface.

Once a shape or animation has been selected, the remote user can interact with the remote video feed either using touch input, gesture input, pointer input, or a mouse type input. As the user locates (e.g., hovers) the cursor over the video feed, the cursor can change to reflect the selected shape or brush style and size, as in block 322. As the cursor moves around the video feed, the robotic device's projector can project the cursor within the robotic device's environment in relation to the projection surface, as in block 324. The cursor shape seen by the remote user can be a projection of the cursor in the robotic device's environment and can be seen via the robotic device's video feed.

Using the equivalent input signal of a mouse down and/or drag movement, the remote user can draw on the remote video feed or drop a shape on the video feed, as in block 326. As the drawing occurs, the projector can show the shape or user's drawing projected in the robotic device's environment, as in block 328. In addition, the user can clear the area to create new drawings or drop new shapes. The user can also save the combination of shapes and drawings created to reuse for projection on a different surface.

By standing in front of the camera, the local user can interact with drawings, shapes, or objects by moving various parts of the local user's body (e.g. arms, head, feet, legs). The cameras can interpret user movement and the robotic device can correlate the local user's movement with the projected shapes or objects such that a change in the projected image occurs. The local user may be located between the projector and the projector surface or the local user may be located next to the projection surface to interact with objects in the projected image using gestures to produce a change in the projected image. This change can then communicated back to the remote telepresence application and can be shown to the remote user. Such feedback can allow the remote user and the local user to view the change similarly. Interactive shapes or objects can be predefined to allow the local and remote user to interact with the whole object or with parts of the object.

The remote telepresence application can also assist the remote user in what the remote user may be drawing based on information provided about the projection surface or projection surface coordinates from the camera using either depth data or using edge detection on the video stream. As an example, if a contiguous bordered area is found (e.g. a picture frame or cupboard door) in a camera image, the remote user can utilize an auto-fill function to automatically project a different color that is bounded by this area, without having to create a rectangle. The remote user can also be assisted when drawing shapes or objects so that the shapes or objects "snap" to existing fixtures or features of the projection surface.

Figure 4:
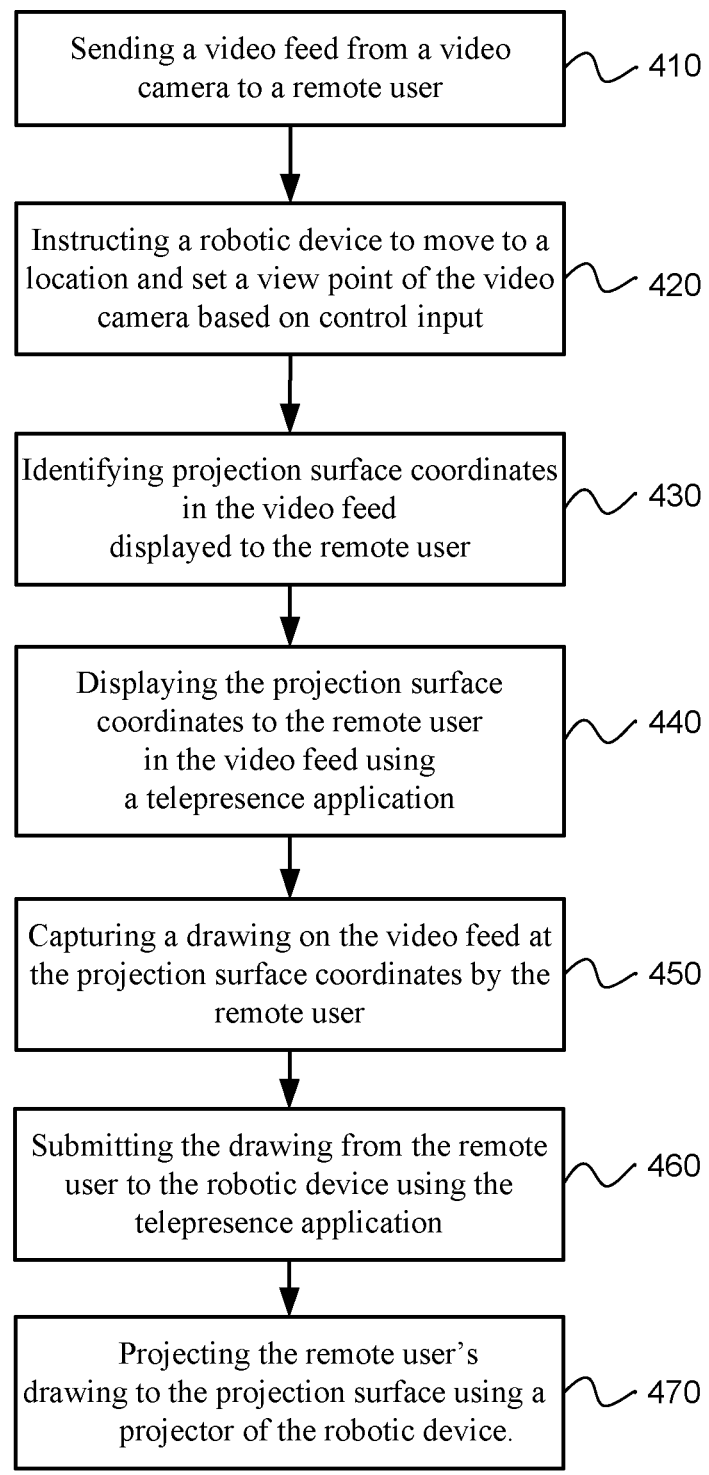
FIG. 4 is a block diagram illustrating an example of a detailed method for visually communicating using a robotic device.

FIG. 4 illustrates an additional example of a method for communicating using a robotic device. The method can include sending a video feed from a video camera of the robotic device to a remote user, as in block 410. A robotic device can be instructed to move to a location and set a view point of a video camera based on control input from the remote user, as in block 420. The control input from the remote user can include relative local coordinates, location tags, absolute global positioning coordinates, or joystick type of controls.

The projection surface coordinates can be identified in the video feed and displayed to the remote user, as in block 430. The projection surface coordinates can be displayed to the remote user in the video feed using a telepresence application, as in block 440.

A drawing by the remote user can be captured at the projection surface coordinates on the video feed, as in block 450. The drawing from the remote user can be submitted to the robotic device using the telepresence application, as in block 460. Then the remote user's drawing can be projected to the projection surface using a projector of the robotic device, as in block 470.

The technology described includes the ability for a remote user to virtually draw on surfaces in a robotic device's environment using a robotic device's projector. A remote user's drawing can be converted into light patterns as the drawing is created and those patterns can be projected onto the robotic device's environment using the robotic device's projector.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method implemented by one or more computer processing devices, the method comprising:
   receiving, at a first location, a video feed from a video camera of a robotic device that is at a second location;
   automatically selecting a drawing projection surface at the second location from multiple possible projection areas that are visible in the video feed, the automatically selecting comprising using edge detection to detect a contiguous bordered area that is suitable as the drawing projection surface;
   obtaining a drawing by a first user that is at the first location;
   instructing the robotic device to project the drawing at the second location;
   receiving a user instruction from the first user, the user instruction being relative to the contiguous bordered area;
   applying a drawing function to the contiguous bordered area based at least on the user instruction, the drawing function being applied by instructing the robotic device to project the drawing function into the contiguous bordered area;
   receiving an updated video feed from the video camera of the robotic device, wherein the updated video feed shows the drawing function applied to the contiguous bordered area and the projected drawing by the first user; and
   displaying the updated video feed at the first location.

2. The method as in claim 1, further comprising:
   receiving adjustments to the automatically selected drawing projection surface from the first user; and
   sending alignment instructions for aligning the video camera to the robotic device, wherein the alignment instructions are based at least on the adjustments.

3. The method as in claim 1, further comprising:
   receiving input from a second user at the second location, the input representing interaction of the second user with the projected drawing on the drawing projection surface; and
   causing the robotic device to modify the projected drawing based at least on the input received from the second user.

4. The method of claim 1, further comprising:
   identifying a shape of the drawing projection surface using data obtained from a depth camera of the robotic device; and
   modifying the projected drawing to accommodate the shape of the drawing projection surface.

5. The method as in claim 1, wherein the drawing function comprises auto-filling of the contiguous bordered area with a particular color.

6. A mobile robotic device, comprising:
   a video camera;
   a depth camera;
   a projector;
   a processor; and
   memory storing computer readable instructions which, when executed by the processor, cause the processor to:
   send a video feed from the video camera to a remote device that displays the video feed to a remote user;
   cause the mobile robotic device to navigate to a location based at least on coordinates received from the remote device;
   cause the mobile robotic device to set a point of view of the video camera;
   use the depth camera to identify a contiguous bordered area at the location;
   receive, from the remote device, an instruction to perform a drawing function within the contiguous bordered area; and
   responsive to the instruction, use the projector to perform the drawing function by projecting light into the contiguous bordered area.

7. The mobile robotic device as in claim 2, wherein the computer readable instructions further cause the processor to:
   communicate an updated video feed showing the drawing function performed in the contiguous bordered area back to the remote device.

8. The mobile robotic device as in claim 2, wherein the drawing function comprises auto-filling the contiguous bordered area with a particular color.

9. The mobile robotic device as in claim 2, wherein the computer readable instructions further cause the processor to:
   receive a freehand drawing from the remote device;
   apply a graphical transformation to the freehand drawing to obtain a transformed freehand drawing; and
   cause the transformed freehand drawing to be projected as light ink onto a selected projection surface, wherein the graphical transformation conforms the light ink to a shape of the selected projection surface.

10. The mobile robotic device as in claim 9, wherein the computer readable instructions further cause the processor to:

use edge detection on aspects of the selected projection surface to assist the remote user in creating the freehand drawing.

11. A system comprising:
a processing device; and
a hardware memory device storing computer readable instructions which, when executed by the processing device, cause the processing device to:
obtain a video feed from a video camera of a robotic device;
use edge detection to select a contiguous bordered area shown in the video feed as a projection surface from multiple possible projection areas at a location of the robotic device;
obtain a drawing instruction from a remote user at another location;
send the drawing instruction received from the remote user to the robotic device, wherein the drawing instruction is performed by projecting light onto the selected projection surface by a projector of the robotic device;
obtain a continued video feed from the video camera of the robotic device, wherein the continued video feed shows the projected light in the contiguous bordered area; and
display the continued video feed.

12. The system as in claim 11, wherein the computer readable instructions further cause the processing device to:
instruct the robotic device to set a field of view of the video camera, wherein the contiguous bordered area is within the field of view.

13. The system as in claim 11, embodied as a mobile computing device.

14. The system as in claim 11, embodied as a gaming console.

15. The system as in claim 11, wherein the drawing instruction instructs the robotic device to auto-fill the contiguous bordered area with a particular color.

16. The system as in claim 11, wherein the computer readable instructions further cause the processing device to:
use input received from a depth camera of the robotic device to identify a shape of the selected projection surface; and
cause the robotic device to conform the projected light to the shape of the selected projection surface.

17. The system as in claim 11, wherein the computer readable instructions further cause the processing device to:
present a plurality of drawing tools to the remote user;
receive an input from the remote user identifying a selected drawing tool;
receive a freehand drawing created by the remote user with the selected drawing tool; and
instruct the robotic device to project the freehand drawing.

18. The system as in claim 17, wherein the selected drawing tool is a paint brush.

19. The system as in claim 18, wherein the computer readable instructions further cause the processing device to:
receive another input from the remote user identifying a selected color for the freehand drawing painted with the paint brush; and
instruct the robotic device to use the selected color for the freehand drawing.

20. The system as in claim 17, wherein the computer readable instructions further cause the processing device to:
instruct the robotic device to conform the freehand drawing to the contiguous bordered area.

* * * * *